(12) United States Patent
Pursifull (10) Patent No.: US 8,590,514 B2
(45) Date of Patent: Nov. 26, 2013

(54) AIRFLOW GENERATING DEVICE FOR ALTERNATOR COOLING AND VAPOR CANISTER PURGING

(75) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 838 days.

(21) Appl. No.: 12/814,167

(22) Filed: Jun. 11, 2010

(65) Prior Publication Data

US 2011/0307157 A1 Dec. 15, 2011

(51) Int. Cl.
*F02M 33/02* (2006.01)

(52) U.S. Cl.
USPC ......................................................... 123/520

(58) Field of Classification Search
USPC ....................................... 123/41.31, 516–521
See application file for complete search history.

(56) References Cited

U.S. PATENT DOCUMENTS

| | | | |
|---|---|---|---|
| 4,014,410 A | 3/1977 | Bryant | |
| 4,016,837 A | 4/1977 | Wentworth, Jr. | |
| 5,273,020 A * | 12/1993 | Hayami | 123/520 |
| 5,390,645 A | 2/1995 | Cook et al. | |
| 5,557,930 A | 9/1996 | Cakmaz et al. | |
| 5,961,189 A | 10/1999 | Lutteke et al. | |
| 6,014,958 A | 1/2000 | Miwa et al. | |
| 6,425,356 B1 | 7/2002 | Pischinger et al. | |
| 6,931,919 B2 * | 8/2005 | Weldon | 73/114.39 |
| 7,077,112 B2 * | 7/2006 | Mitani et al. | 123/518 |
| 7,086,276 B2 * | 8/2006 | Cook et al. | 73/40.5 R |
| 7,370,642 B2 * | 5/2008 | Amano et al. | 123/520 |
| 7,966,996 B1 * | 6/2011 | Pursifull | 123/518 |
| 8,297,263 B2 * | 10/2012 | Pursifull | 123/518 |
| 2003/0192365 A1 * | 10/2003 | Perry et al. | 73/49.7 |
| 2006/0196482 A1 * | 9/2006 | Kakimoto et al. | 123/519 |
| 2007/0063579 A1 | 3/2007 | Carlsson | |
| 2008/0302100 A1 | 12/2008 | Ohtani et al. | |

OTHER PUBLICATIONS

Pursifull, Ross Dykstra, "Vacuum Supply System," U.S. Appl. No. 12/717,033, filed Mar. 3, 2010, 29 pages.

* cited by examiner

*Primary Examiner* — Stephen K Cronin
*Assistant Examiner* — Sizo Vilakazi
(74) *Attorney, Agent, or Firm* — Julia Voutyras; Alleman Hall McCoy Russell & Tuttle LLP (57) ABSTRACT

Various systems and methods for an engine in a vehicle which includes an airflow generating device coupled between an alternator and a fuel vapor canister are described. In one example, airflow from the airflow generating device is directed to cool the alternator during a first mode such as when the alternator temperature is greater than a threshold temperature. During a second mode when the alternator temperature is less than the threshold temperature and the engine is boosted, for example, the airflow from the airflow generating device is directed to assist purging of fuel vapors from the fuel vapor canister.

20 Claims, 4 Drawing Sheets

AIRFLOW GENERATING DEVICE FOR ALTERNATOR COOLING AND VAPOR CANISTER PURGING

TECHNICAL FIELD

The present application relates to an airflow generating device, and more particularly, to an airflow generating device used for selectively cooling an alternator and assisting fuel vapor purging flow.

BACKGROUND AND SUMMARY

Vehicles may have a fuel vapor recovery system which includes a fuel vapor storage canister (e.g., carbon canister) for trapping fuel vapors from the fuel tank that may contain vaporized hydrocarbons, for example. During engine operation, the trapped fuel vapors may be purged from the fuel vapor canister and released to the engine intake for combustion. In some examples, the pressure in the fuel vapor recovery system needs to be greater than the intake air pressure in order for the purge flow containing fuel vapors to enter the intake. Beyond the pressure difference, a flow of air that is not saturated with fuel vapor is often required to strip the adsorbed hydrocarbons from the canister's HC storage sites. When an engine is boosted, for example, the intake air pressure, such as in the intake manifold, increases above atmospheric pressure and thus there may be insufficient pressure differences available to draw the purge flow into the engine intake.

The inventor herein has recognized the above problem and has devised an approach to at least partially address it. Thus, a method for an engine in a vehicle is disclosed. The method comprises, under a first operating mode, cooling an alternator coupled to the engine via an airflow generating device, and, under a second operating mode, purging a fuel vapor canister by assisting flow into the fuel vapor canister via the airflow generating device.

In this manner, the airflow generating device may be used to increase the flow rate or pressure of the purge flow through fuel vapor canister during conditions when the airflow generating device is not needed to cool the alternator, yet increased purge flow is needed, such as when the alternator temperature is less than a threshold temperature, for example, and when the manifold air pressure is relatively high. As such, the purge flow may be more easily routed to the intake manifold during conditions such as when the engine is boosted. At the same time, when alternator cooling is needed, the device can provide such cooling. Thus, the approach can achieve improved performance by obtaining double duty from a single airflow generating device.

Alternately, one may choose to provide that same alternator air flow rate through an ejector and thus provide suction with which to draw fuel vapors from the canister and pass them into the engine inlet air stream at an appropriate point. In this way, the canister functions conventionally thus avoiding design changes necessitated by having to change the system to a "vapor push" system from a "vapor pull" system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for an engine in a vehicle which includes a fuel vapor recovery system with an airflow generating device coupled between an alternator and a fuel vapor canister. In one example, airflow from the airflow generating device may be directed to cool the alternator during a first mode such as when the alternator temperature is greater than a threshold temperature (inferred or measured). During a second mode when the alternator temperature is less than the threshold temperature and the engine is boosted, for example, the airflow from the airflow generating device may be directed to purge fuel vapors from the fuel vapor canister. Further, the amount of airflow from the airflow generating device may be adjusted during the second mode based on the manifold air pressure, for example, and the desired amount of purge flow to the engine.

Figure 1:
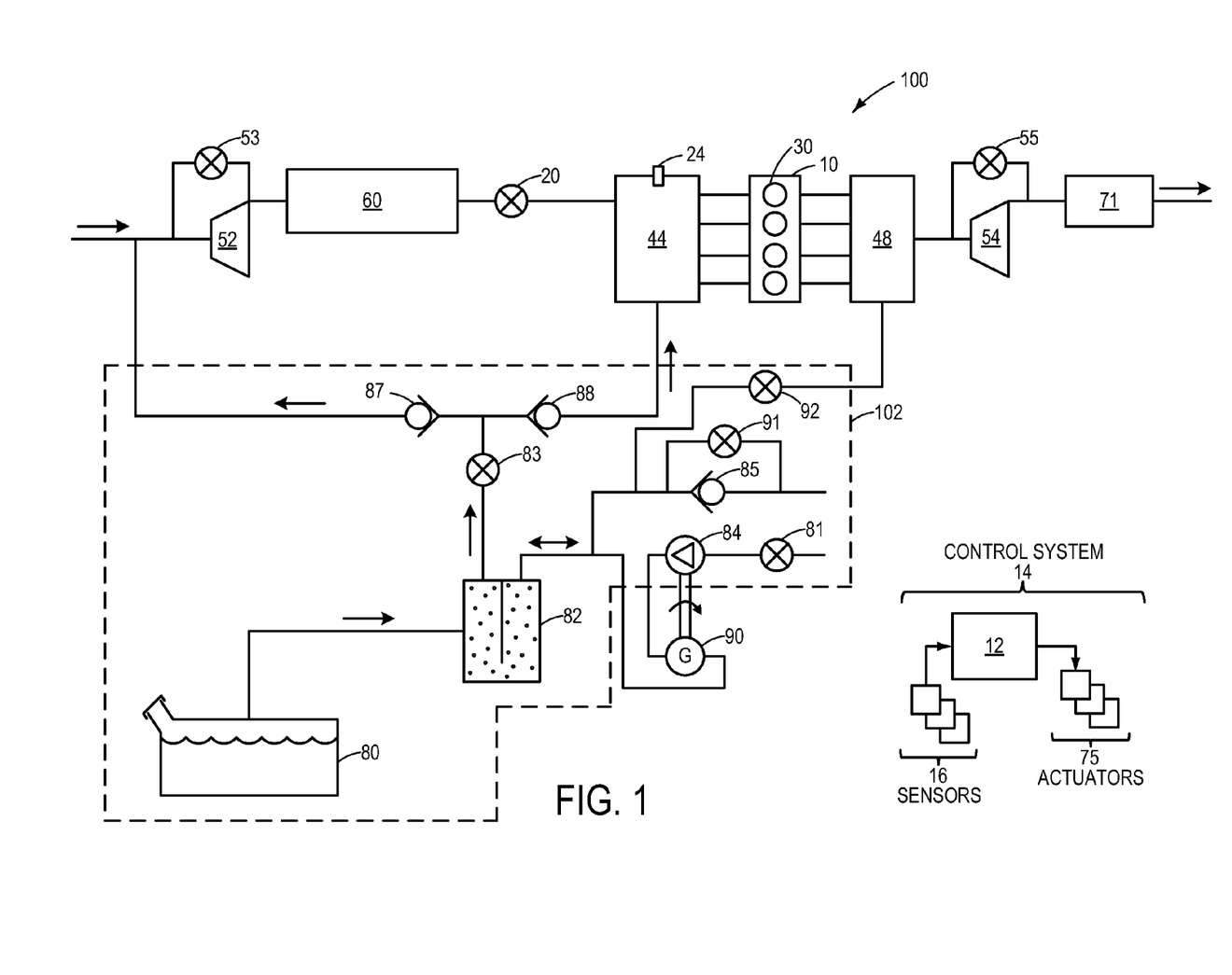
FIG. 1 shows a schematic diagram of an engine including an airflow generating device coupled between an alternator and a fuel vapor canister.

FIG. 1 shows a schematic diagram of vehicle system 100. Vehicle system 100 includes engine 10 which may be included in a propulsion system of an automobile, engine 10 having a plurality of cylinders 30. Engine 10 may be controlled at least partially by a control system 14 including controller 12 and by input from a vehicle operator via an input device (not shown in FIGS. 1 and 2). Vehicle system 100 includes exhaust manifold 48 eventually leading to a tailpipe (not shown in FIG. 1) that eventually routes exhaust gas to the atmosphere.

Vehicle system 100 further includes control system 14. Control system 14 is shown receiving information from a plurality of sensors 16 (various examples of which are described herein) and sending control signals to a plurality of actuators 75 (various examples of which are described herein). As one example, sensors 16 may include manifold air pressure (MAP) sensor 24 located in intake manifold 44. Additionally, other sensors such as fuel tank pressure, intake manifold UEGO, temperature, air-fuel ratio, and composition sensors may be coupled to various locations in vehicle system 100. As another example, the actuators may include actuators for fuel injectors (not shown), throttle 20, canister purge valve (CPV) 83, canister vent valve (CVV) 81, compressor bypass valve (CBV) 53, and other control valves that are not shown in FIG. 1.

Control system 14 includes controller 12. Controller 12 may be a microcomputer including the following, although not shown in FIG. 1: a microprocessor unit, input/output ports, an electronic storage medium for executable programs and calibration values (e.g., a read only memory chip), random access memory, keep alive memory, and a data bus. Storage medium read-only memory may be programmed with computer readable data representing instructions executable by the microprocessor for performing the methods described below as well as other variants that are anticipated but not specifically listed. For example, the controller may receive communication (e.g., input data) from the various sensors, process the input data, and trigger the actuators in response to the processed input data based on instruction or code programmed therein corresponding to one or more routines. Example control routines are described herein with regard to FIGS. 2 and 3.

Engine 10 may further include a compression device such as a turbocharger or supercharger including at least a compressor 52 arranged along an intake passage. For a turbocharger, compressor 52 may be at least partially driven by turbine 54 via a shaft (not shown) arranged along the exhaust passage. For a supercharger, compressor 52 may be at least partially driven by the engine and/or an electric machine, and may not include a turbine. Thus, the amount of compression provided to one or more cylinders of the engine via a turbocharger or supercharger may be varied by controller 12. Further, engine system 100 includes compressor bypass valve (CBV) 53 to release pressure in the intake system when the engine is boosted. Wastegate 55 is provided to divert exhaust gases to regulate the speed of turbine 54, for example.

Emission control device 71 is shown arranged along the exhaust passage downstream of turbine 54. Emission control devices 71 may be a selective catalytic reduction (SCR) system, three way catalyst (TWC), $NO_x$ trap, various other emission control devices, or combinations thereof. For example, device 71 may be a TWC and device 72 (not shown in FIG. 1) may be a particulate filter (PF). Further, in some embodiments, during operation of engine 10, emission control device 71 may be periodically reset by operating at least one cylinder of the engine within a particular air/fuel ratio.

Vehicle system 100 further includes charge air cooler (CAC) 60. CAC 60 is arranged along the intake passage upstream of compressor 52 for cooling the engine intake air after it has passed through the turbocharger and/or if it is diluted with EGR, for example.

Further, vehicle system 100 includes fuel vapor recovery system 102. Fuel vapor recovery system 102 includes fuel tank 80 which may hold a plurality of fuel blends, including fuel with a range of alcohol concentrations, such as various gasoline-ethanol blends, including E10, E85, gasoline, etc., and combinations thereof. A fuel tank pressure sensor (not shown), may be included between fuel tank 80 and fuel vapor canister 82, to provide an estimate of a fuel tank pressure, and for engine-off leak detection, for example. Fuel vapor 82 canister may be filled with adsorbent to temporarily trap fuel vapors (including vaporized hydrocarbons) during fuel tank refilling operations and "running loss" (that is, fuel vaporized during vehicle operation). In one example, the adsorbent used is activated charcoal.

Fuel vapor canister may communicate with the atmosphere through canister vent valve (CVV) 81. (CVV 81 may be optionally located anywhere along the line leading to the canister 82.) CVV 81 which may route gases (e.g., air) out of the fuel vapor recovery system 102 to the atmosphere when storing, or trapping, fuel vapors from fuel tank 80. CVV 81 may also allow fresh air to be drawn into fuel vapor recovery system 102 when purging stored fuel vapors from fuel system 18 to engine intake, as will be described below. Further, the flow of air and vapors between fuel vapor canister 82 and the atmosphere may be adjusted via canister vent valve 81. Operation of the canister vent valve 108 may be regulated by a canister vent solenoid (not shown). Based on whether fuel vapor recovery system 102 is to be sealed or not sealed from the atmosphere, the canister vent valve may be closed or opened. Specifically, controller 12 may energize the canister vent solenoid to close canister vent valve 108 and seal the system from the atmosphere. In contrast, when the canister vent solenoid is at rest, the canister vent valve 108 may be opened and the system may be open to the atmosphere.

Fuel vapor recovery system 102 may further include pressure relief valve 85 which routes airflow from fuel vapor recovery system 102 to the atmosphere. Pressure relief valve 85 may be a check valve, as shown, such that air from fuel vapor recovery system 102 can only flow in one direction (e.g., out of fuel vapor recovery system). As such, pressure relief valve 85 may be used to control or limit the pressure in fuel vapor recovery system 102, for example. In the illustrated embodiment, vehicle system 100 further includes bypass valve 91 which routes airflow around check valve 85 which may be controlled by control system 14, for example. When bypass valve 91 is opened, airflow from fuel vapor recovery system 102 may be vented to the atmosphere. In this manner, purge flow assistance through the fuel vapor canister 82 may be controlled, for example.

Further, fuel vapor recovery system 102 is coupled to exhaust manifold 48 via a line extending from downstream of bypass valve 91 to exhaust manifold 48. Valve 92 may be controlled by control system 14 to inject secondary air to exhaust manifold 48 in a thermactor system, for example, a port electric thermactor air system (PETA). For example, during a cold start, valve 92 may be opened to inject secondary air into exhaust manifold 48 to thereby combust unburned fuel remaining in the exhaust. Additionally, or optionally, the injection of secondary air may be supplemented with additional fuel to substantially increase the exhaust temperature and thereby decrease the light-off time of an exhaust catalyst (e.g., emission control device 71). Fuel vapor recovery system 102 may further include valves 94 and 95, as shown in the embodiment illustrated in FIG. 1, that may be closed when valve 92 is opened to allow air flow to exhaust. As such, air may only flow between the alternator and the exhaust manifold.

Further, in another embodiment, fuel vapor recovery system 102 may include a blower-powered ejector coupled in an airflow line between alternator 90 and canister purge valve 83 (not shown). The ejector may be operated to create a vacuum thereby pulling purge flow through fuel vapor canister 82 rather than pushing the purge flow through fuel vapor canister 82 as described above.

Fuel vapors released from fuel vapor canister 82, for example during a purging operation, may be directed into intake manifold 44. The flow of vapor may be regulated by canister purge valve (CPV) 83, coupled between the fuel vapor canister and the engine intake. The flow of vapor may be further regulated by first check valve 87 and second check valve 88. For example, purge flow through check valve 87 enters the intake at a position upstream of compressor 52. Purge flow through check valve 88 directly enters intake manifold 44 downstream of throttle 20. The check valves 87 and 88 may permit flow in only one direction, and as such, intake air may not pass through check valves 87 and 88 into fuel vapor recovery system 102. Further, check valves 87 and 88 may operate based on a pressure gradient between the intake side and the fuel vapor recovery system side (e.g., open when pressure is greater on the fuel vapor recovery side). For example, based on the pressures in the intake passage and fuel vapor recovery system 102, the flow of vapor leaving CPV 83 may pass through check valve 87 or valve 88.

Further, fuel vapor recovery system includes airflow generating device 84 coupled between canister 82 and canister ventilation valve 81. Airflow generating device is further coupled to alternator 90 which charges the vehicle's electric system and charges the battery while the engine is running. In the embodiment illustrated in FIG. 1, airflow generating device 84 provides a cooling flow to alternator 90 in a first operating mode, provides a purging flow to fuel vapor canister 82 in a second mode of operation, and provides a secondary airflow to exhaust manifold 48 in a third mode of operation. The modes of operation will be further described below with reference to FIGS. 2 and 3. In some examples, airflow generating device 84 may be an electric pump, an engine-driven pump, or a clutched engine-driven pump. For example, the pump may be operated only when alternator cooling and/or purge flow assist is desired. In other examples, airflow generating device may be a fan driven by the alternator shaft. In such an example, the fan may remain on while the alternator is on and airflow from the fan may be dumped to the atmosphere (e.g., via bypass valve 91 or pressure relief valve 85) or to exhaust manifold 48 (e.g., via valve 92) when purge flow assist is not desired. In some examples, the airflow is heated by the alternator and the heated airflow may provide synergistic benefits. For example, fuel vapor canister purging may be improved with a hot air flow and, during a cold start, engine operation may benefit from heated intake air (e.g., pumping losses are reduced).

Figure 2:
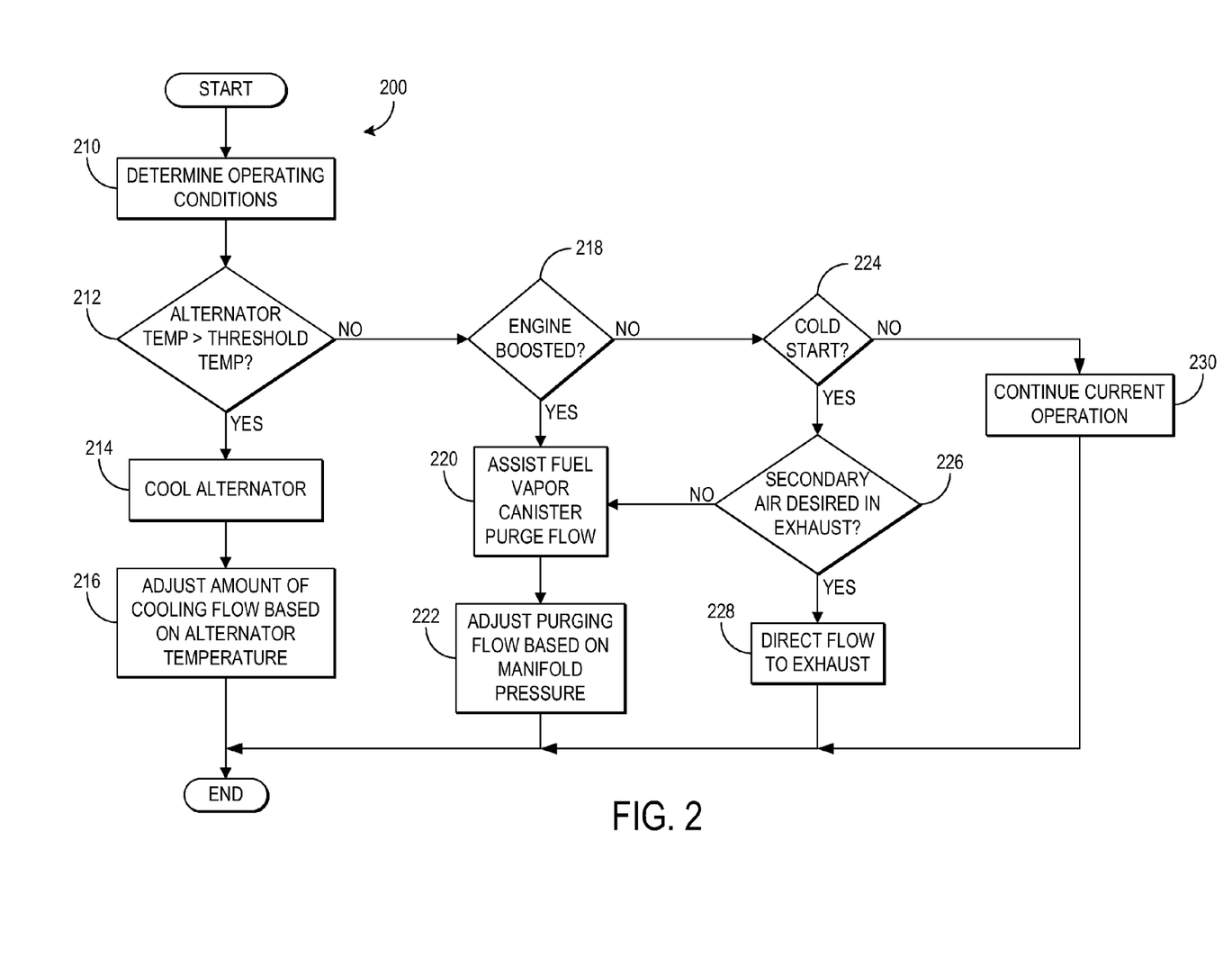
FIG. 2 shows a flow chart illustrating a routine for operating an airflow generating device.

FIG. 2 shows a flow chart illustrating a control routine 200 for operating an airflow generating device coupled between an alternator and a fuel vapor canister, the airflow generating device being an electric pump or an engine driven pump, such as airflow generating device 84 described above. Specifically, routine 200 directs the flow of the airflow generating device based on operating conditions such as alternator temperature and manifold pressure.

At 210 of routine 200, operating conditions are determined. Operating conditions may include intake manifold air pressure, alternator temperature, engine boost level, etc.

Once the operating conditions are determined, routine 200 proceeds to 212 where it is determined if the alternator temperature is greater than a threshold temperature. An estimate of the alternator temperature may be obtained from one or more temperature sensors positioned within the alternator, for example, and communicated with controller. During vehicle operation, the temperature of the alternator may vary. For example, when the alternator is operating under a high load the temperature may be higher than when the alternator is operating under a lighter load. The threshold temperature of the alternator may be based on alternator speed, charging current, or other parameters.

If it is determined that the alternator temperature is greater than the threshold temperature, routine 200 continues to 214 where flow from the airflow generating device is directed to cool the alternator (e.g., a first operating mode). At 216 of routine 200, an amount of cooling flow is adjusted based on the alternator temperature. For example, the higher the temperature of the alternator, the greater the cooling flow generated by the airflow generating device (within the limits of the airflow generating device).

On the other hand, if it is determined that the alternator temperature is less than the threshold temperature, routine 200 moves to 218 where it is determined if the engine is boosted. For example, the engine may be considered boosted when the wastegate of the turbocharger is at least partially closed and high pressure air is entering the intake manifold via the compressor which causes an increase in intake manifold pressure. In some examples, the engine may be considered boosted when the boost pressure is greater than a threshold pressure and enough of a pressure gradient exists to consume the purge effluent at a target rate.

If it is determined that the engine is boosted at 218, routine 200 continues to 220 and airflow from the airflow generating device is directed push air through and assist purge flow through the fuel vapor canister (e.g., a second operating mode). At 222 of routine 200, an amount of purging airflow from the airflow generating device is adjusted based on the manifold air pressure. For example, in some examples, the device may include a fan that operates at a variable speed relative to the alternator. In this example, the higher the MAP, the greater the amount of purging airflow is selected to purge the canister and route the vapor flow to the engine, and thus the higher the speed at which the device is operated, and vice versa. An estimate of the manifold air pressure (MAP) may be obtained from the MAP sensor coupled to intake manifold (e.g., MAP sensor 24 shown in FIG. 1), for example, and communicated with controller 12. Alternatively, manifold air pressure may be inferred from alternate engine operating conditions, such as a manifold air flow (MAF), as measured by a MAF sensor (not shown in FIG. 1) coupled to the intake manifold. In this way, flow assistance from the alternator cooling device may be used to increase fuel vapor purging during conditions where reduced alternator cooling is needed to maintain alternator temperatures, yet sufficient alternator cooling is still achieved under increased cooling needs.

Note that in addition to selectively re-routing alternator cooling device flow depending on both alternator temperature and fuel vapor purging flow needs (as described herein), the alternator may also be adjusted based on such conditions. For example, if increased vapor purge flow is requested (e.g., due to high ambient temperatures, high amounts of stored vapors, high vapor concentrations in the purge flow, etc.), yet alternator temperature is above a threshold indicating a need for alternator cooling, then rather than divert purge vapor flow assistance to alternator cooling, an alternative approach may be used during select conditions. Specifically, alternator charging, or discharging currents may be reduced to reduce alternator temperature. This may delay the alternator reaching a threshold temperature, and thus extend the vapor purge flow assistance by the alternator cooling device, at least under some conditions.

Continuing with FIG. 2, if it is determined that the engine is not boosted at 218, routine 200 moves to 224 where it is determined if the engine is under a cold start. As referred to herein, "cold start" implies the engine is started under conditions in which the engine has cooled to ambient conditions, which may be relatively hot or cold. If the engine is not under cold start conditions, routine 200 moves to 230 and the engine continues current operation.

On the other hand, if it is determined that the engine is under a cold start, routine 200 proceeds to 226 where it is determined if secondary air is desired in the exhaust manifold. For example, secondary air may be desired in a PETA system in order to expedite heating of the exhaust catalyst, as described above. If it is determined that secondary air is desired in the exhaust manifold, routine 200 continues to 228 and flow from the pump is directed to the exhaust manifold by opening a valve (e.g., a third operating mode), for example, such as valve 92 described above with reference to FIG. 1. Further, valves 94 and 95 (shown in FIG. 1) may be closed such that air may only flow between the exhaust manifold and the alternator when valve 92 is open.

If, instead, it is determined that secondary air is not desired in the exhaust manifold, routine 200 moves to 220 where flow from the pump is directed to assist fuel vapor canister purge flow. In such a configuration, the heated (e.g., via heat exchange with the alternator) airflow from the pump assists in removing adsorbed HCs from the fuel vapor canister and the heated air may reduce pumping losses since the engine is under a cold start.

Figure 3:
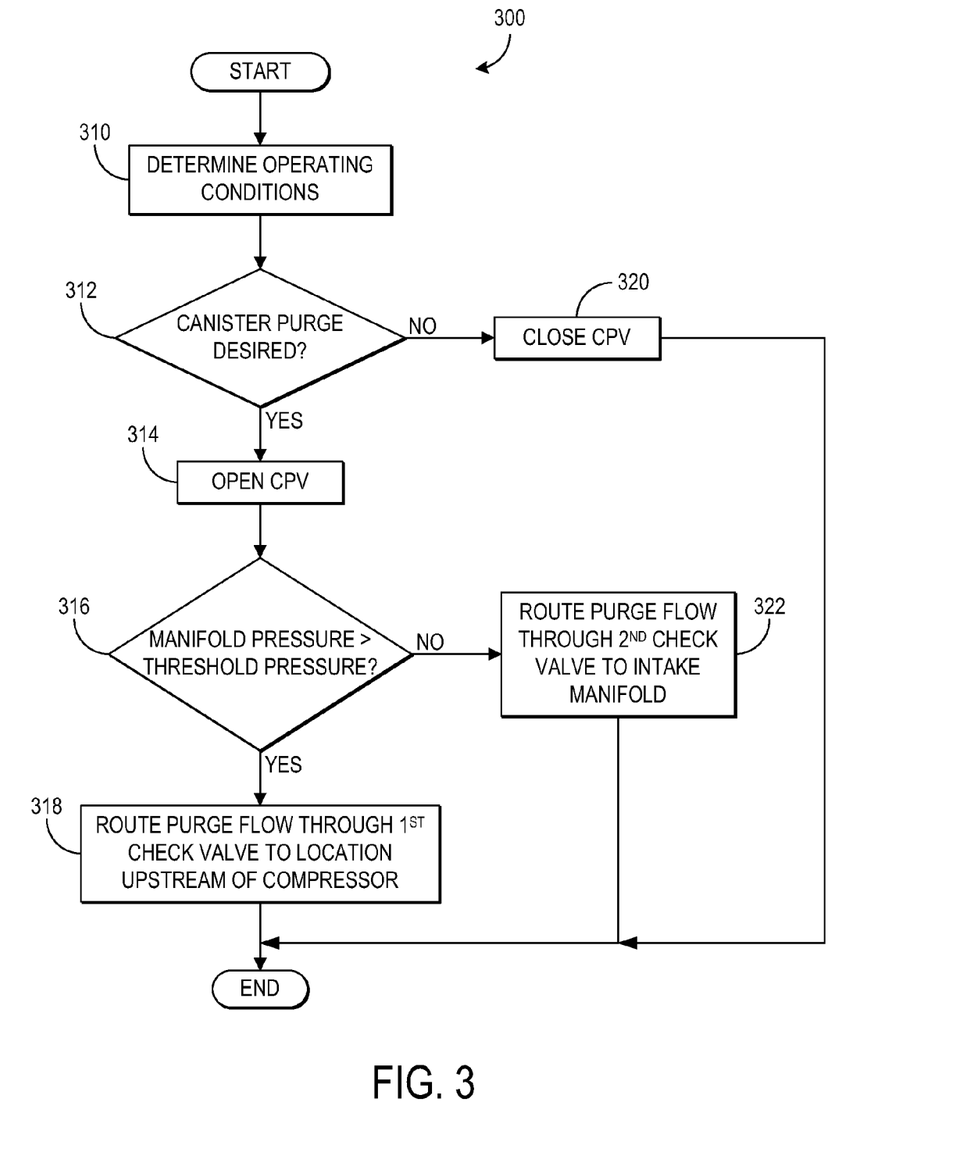
FIG. 3 shows a flow chart illustrating a routine for purging a fuel vapor canister.

Continuing to FIG. 3, a control routine 300 for purging a fuel vapor canister, such as fuel vapor canister 82 described above with reference to FIG. 1, is shown. Specifically, routine 300 purges the fuel vapor canister based on pressure measurements obtained within the intake manifold of the engine and fuel vapor recovery system.

At 310 of routine 300, operating conditions are determined. For example, engine operating conditions may include manifold air pressure, pressure within the fuel recovery system, state of fuel vapor canister, etc.

Once the operating conditions are determined, routine 300 proceeds to 312 where it is determined if a canister purge is desired. For example, fuel vapor purge may be desired during conditions in which the fuel vapor canister has a threshold amount of hydrocarbons stored and the engine is operating under conditions in which excess hydrocarbons (e.g., fuel vapor from the fuel vapor canister) from the fuel vapor canister may be combusted, such as high load conditions. As another example, fuel vapor canister may be undergoing a diagnostic to check the fuel vapor recovery system and canister purge may not be desired. If it is determined that fuel vapor purge is not desired, routine 300 moves to 320 where the canister purge valve (CPV) (e.g., CPV 83 in FIG. 1) is closed (if the purge valve is currently open) and the routine ends.

On the other hand, if it is determined that fuel canister purge is desired, routine 300 continues to 314 where the CPV is opened (if the purge valve is currently open). The position of the CPV may be controlled by an actuator in communication with the controller, for example. In some examples the CPV valve may be a butterfly valve, and its position may be controlled to allow more or less vapor flow through the valve depending on operating conditions (e.g., how much purge flow the engine can handle).

Once the CPV is open, routine 300 proceeds to 316 where it is determined if the manifold air pressure is greater than a threshold pressure. Manifold air pressure may be obtained as described above with reference to FIG. 2. The threshold pressure may be a pressure within the fuel vapor recovery system. For example, the threshold pressure sensor may be obtained via a pressure sensor positioned between the fuel vapor canister and the CPV.

If it is determined that the manifold air pressure is greater than the threshold pressure, routine 300 moves to 318 and the purge flow from the fuel vapor canister is routed to a location upstream of the compressor through a first check valve. For example, during the first operating mode of the airflow generating device, the canister ventilation valve (CVV) may be open and the pressure in the fuel vapor recovery system may be slightly greater than atmospheric pressure (e.g., due to pressure from the fuel tank). Under a first condition in which the engine is boosted, the manifold pressure is greater than the pressure in the fuel vapor recovery system and the purge flow cannot flow through the second check valve. Because the pressure on the intake side of the first check valve is close to atmospheric pressure (e.g., it has not gone through the compressor), the purge flow can pass through the first check valve. In such an example, the purge flow rate through the first check valve may be relatively low due the small pressure gradient at the first check valve.

As another example, during the second operating mode, the engine is boosted and the airflow generating device is purging the fuel vapor canister (e.g., blowing high pressure air through the fuel vapor canister) and the pressure in the fuel vapor system may be greater than atmospheric. The boost pressure in the intake manifold may be much greater than the pressure in the fuel vapor recovery system and the purge flow cannot flow through the second check valve. Because the pressure on the intake side of the first check valve is still close to atmospheric pressure, the purge flow can pass through the first check valve. In this example, the purge flow rate through the first check valve may be relatively high due to the large pressure gradient at the first check valve.

Continuing with FIG. 3, on the other hand, if it is determined that the manifold pressure is less than the threshold pressure, routine 300 moves to 322 where the purge flow is routed to the intake manifold via the second check valve. For example, during the first operating mode, the pressure in the fuel vapor recovery system may be slightly greater than atmospheric pressure, as described above. Under a second condition in which the engine is not boosted, pressure in the intake manifold may be less than atmospheric pressure (e.g., manifold vacuum). Because the pressure on the intake side of the second valve is greater than the pressure on fuel vapor recovery system side, the purge flow can pass through the second check valve. In such an example, some purge flow may pass through the first check valve as well; however, a greater amount of purge flow will pass through the second check valve due to the greater pressure gradient at the second check valve.

Thus, as described above, an airflow generating device may be used to provide a cooling flow to an alternator and a purging flow to a fuel vapor canister during conditions when vapor canister purging is desired. Further, the purge flow to the engine may be adjusted via the canister purge valve and pressure gradients across the check valves (e.g., controlling pressure in the vapor purge recovery system via the airflow generating device).

Figure 4:
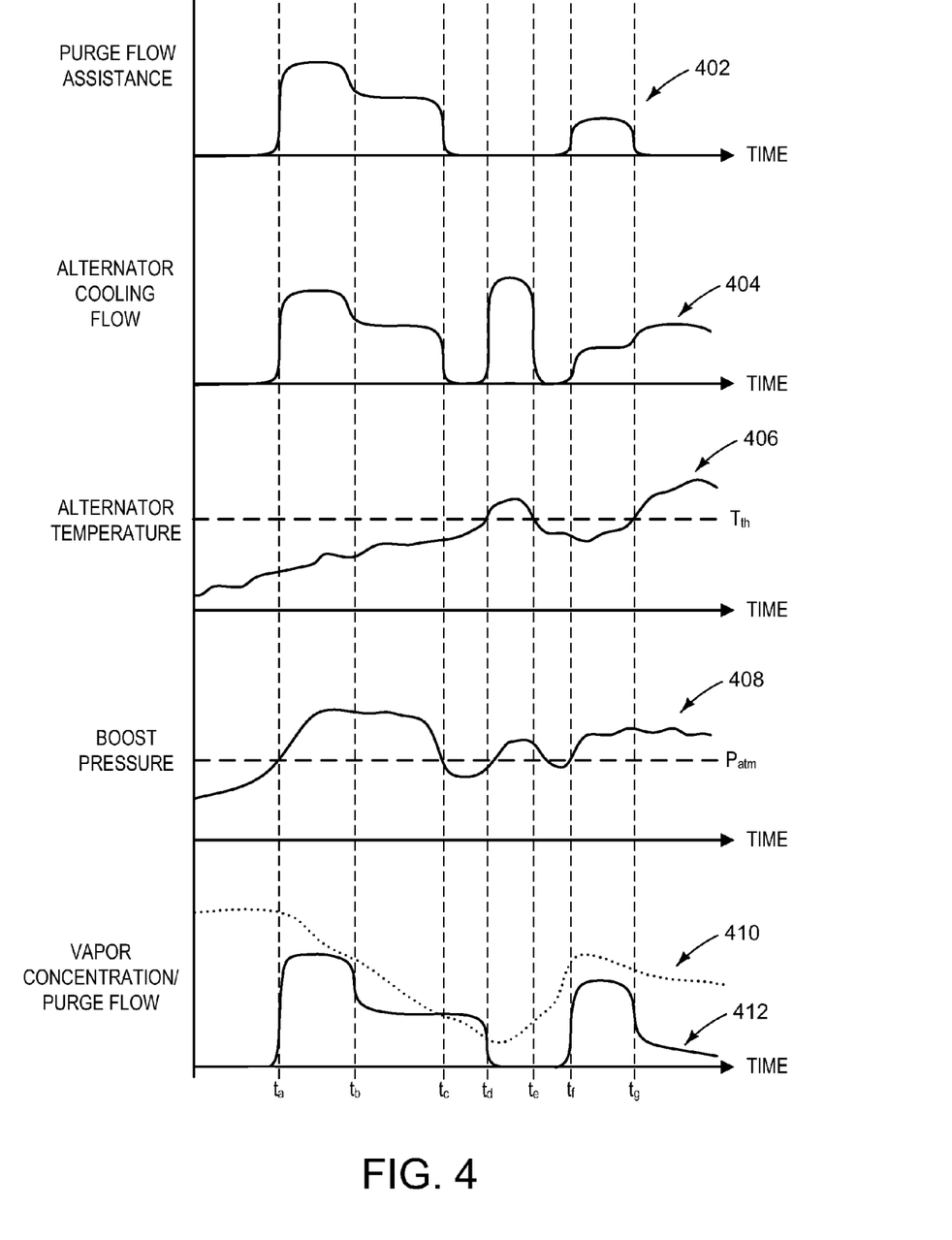
FIG. 4 shows a series of graphs illustrating various parameters over time during operation of an airflow generating device.

FIG. 4 shows a series of graphs illustrating an example of the behavior of various parameters over time during operation of the airflow generating device, such as an electric pump or an engine driven pump. Specifically, FIG. 4 shows an example of purge flow assistance (402), alternator cooling flow (404), alternator temperature (406), boost pressure (408), and vapor concentration (dotted line 410)/overall purge flow (solid line 412) with respect to time.

In the example of FIG. 4, at time $t_a$, the alternator temperature is less than the threshold temperature ($T_{th}$) and the boost pressure increases above atmospheric pressure ($P_{atm}$). As such, the airflow generating device directs flow to the fuel vapor canister in order to assist the purge flow. At time $t_b$, because the vapor concentration in the fuel vapor canister is decreasing, the purge flow assistance decreases thereby decreasing the overall purge flow of the fuel vapor canister. When the boost pressure drops below $P_{atm}$ at $t_c$, the purge flow assistance drops to substantially zero and the overall purge flow remains steady as the purge flow may now enter the intake manifold through the second check valve, as described above.

Further, the alternator temperature increases above $T_{th}$ at time $t_d$ and the airflow generating device directs airflow to cool the alternator until time $t_e$ when the alternator temperature falls below $T_{th}$. During this time, in this example, the boost pressure increases and the overall purge flow decreases. As the vapor concentration increases due to the low purge flow, the boost pressure increases above $P_{atm}$ at $t_f$ and the airflow generating device directs flow to the fuel vapor canister and the purge flow assistance increases. Due to the purge flow assistance, the overall purge flow increases.

At time $t_g$, the alternator temperature rises above $T_{th}$ and the airflow generating device directs flow to cool the alternator. In this example, purge flow assistance through the fuel vapor canister decreases at time $t_g$. As a result, excess flow from the pump that leaves the alternator may be dumped to the atmosphere via a valve, such as bypass valve 91 shown in FIG. 1 for example, or a pressure relief valve depending on the pressure in the fuel vapor recovery system, such as pressure relief valve 85 shown in FIG. 1.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for an engine in a vehicle, comprising:
during a first operating mode, cooling an alternator coupled to the engine via an airflow generating device; and
during a second operating mode, purging a fuel vapor canister by assisting vapor flow into or out of the fuel vapor canister via the airflow generating device while a canister purge valve is open.

2. The method of claim 1, wherein the first operating mode includes a temperature of the alternator above a threshold temperature.

3. The method of claim 2, further including, during the first operating mode, adjusting an amount of cooling airflow based on temperature of the alternator.

4. The method of claim 1, wherein the second operating mode includes a temperature of the alternator below a threshold temperature and boosted engine conditions.

5. The method of claim 4, further comprising, during the second operating mode, adjusting an amount of purging airflow based on manifold pressure.

6. The method of claim 1, wherein the airflow generating device is an engine driven pump.

7. The method of claim 1, further comprising, during the first operating mode and during a first condition, routing a purge flow from the fuel vapor canister through a first check valve to a location upstream of a compressor.

8. The method of claim 7, wherein the first condition includes manifold air pressure greater than a threshold pressure.

9. The method of claim 1, further comprising, during the second operating mode and during a second condition, routing a purge flow from the fuel vapor canister through a second check valve to an intake manifold of the engine.

10. The method of claim 9, wherein the second condition includes manifold air pressure less than a threshold pressure.

11. The method of claim 1, further comprising, during the second operating mode, routing purge flow from the fuel vapor canister through a first check valve to a location upstream of a compressor.

12. A method for a turbocharged engine in a vehicle, comprising:
during a first operating mode:
cooling an alternator coupled to the engine via an airflow generating device;
under a first condition, routing a purge flow from a fuel vapor canister through a first check valve to a location upstream of a compressor; and
under a second condition, routing the purge flow from the fuel vapor canister through a second check valve to an intake manifold of the engine;
during a second operating mode, purging a fuel vapor canister by assisting flow into the fuel vapor canister via the airflow generating device while a canister purge valve is open, and routing the purge flow from the fuel vapor canister through the first check valve to the location upstream of the compressor; and
during a third operating mode, routing airflow from the alternator to an exhaust manifold of the engine.

13. The method of claim 12, further comprising, when the engine is not boosted, purging the fuel vapor canister by opening a canister ventilation valve and the canister purge valve.

14. The method of claim 12, wherein the first operating mode includes a temperature of the alternator above a threshold temperature, and further comprising, during the first operating mode, adjusting an amount of cooling airflow based on temperature of the alternator.

15. The method of claim 12, wherein the second operating mode includes a temperature of the alternator below a threshold temperature and boosted engine conditions, and further comprising, during the second operating mode, adjusting an amount of purging airflow based on manifold pressure.

16. The method of claim 12, wherein the first operating condition includes when the engine is boosted.

17. The method of claim 12, wherein the second operating condition includes when the engine is not boosted.

18. A system for an engine in a vehicle, comprising:
an alternator;
a fuel vapor canister;
an airflow generating device coupled to the alternator;
a turbocharger; and
a control system comprising a computer readable storage medium, the medium comprising instructions for:
during a first operating mode:

cooling the alternator via the airflow generating device;
under a first condition, routing a purge flow from a fuel vapor canister through a first check valve to a location upstream of a compressor; and
under a second condition, routing the purge flow from the fuel vapor canister through a second check valve to an intake manifold of the engine;

during a second operating mode, assisting flow into the fuel vapor canister via the airflow generating device while a canister purge valve is open, and routing the purge flow from the fuel vapor canister through the first check valve to the location upstream of the compressor; and during a third operating mode, routing airflow from the alternator to an exhaust manifold of the engine.

19. The system of claim 18, wherein the first operating mode includes a temperature of the alternator above a threshold temperature, and further comprising instructions for, during the first operating mode, adjusting an amount of cooling airflow based on temperature of the alternator.

20. The system of claim 18, wherein the second operating mode includes a temperature of the alternator below a threshold temperature and boosted engine operating modes while a pressure relief valve and a canister ventilation valve are closed, and further comprising, during the second operating mode, adjusting an amount of purging airflow based on manifold pressure.

* * * * *